United States Patent

Shimada et al.

[11] Patent Number: 5,212,762
[45] Date of Patent: May 18, 1993

[54] PLASTIC-CLAD SILICA (PCS) FIBERS AND METHODS AND APPARATUSES FOR PRODUCING THE SAME

[75] Inventors: Katsuhiko Shimada; Tsuneo Takano; Osamu Itamoto; Michisuke Edamatsu; Yasuo Hiromoto, all of Otake, Japan

[73] Assignee: Mitsubishi Rayon Co., Ltd., Tokyo, Japan

[21] Appl. No.: 953,201

[22] Filed: Sep. 29, 1992

Related U.S. Application Data

[63] Continuation of Ser. No. 905,196, Jun. 26, 1952, abandoned, which is a continuation of Ser. No. 798,335, Nov. 26, 1991, abandoned.

[30] Foreign Application Priority Data

Nov. 27, 1990 [JP] Japan ................................. 2-320623

[51] Int. Cl.⁵ .......................... G02B 6/00; B05D 5/06; C03B 25/00
[52] U.S. Cl. .................................... 385/145; 385/142; 385/141; 427/163; 65/3.11; 65/3.4; 65/12
[58] Field of Search ............... 385/128, 141, 142, 143, 385/144, 145, 123; 427/163, 359, 372.2; 65/3.1, 3.11, 3.4, 3.43, 3.44, 12

[56] References Cited

U.S. PATENT DOCUMENTS

| Re. 33,737 | 11/1991 | Hida et al. | 385/141 |
|---|---|---|---|
| 4,317,616 | 3/1982 | Clarke | 385/145 |
| 4,367,918 | 1/1983 | Pinnow | 385/141 |
| 4,431,264 | 2/1984 | Clarke | 385/145 |
| 4,505,542 | 3/1985 | Clarke | 385/126 |
| 4,521,073 | 6/1985 | Murakami et al. | 385/144 |
| 4,606,608 | 8/1986 | Wysocki | 385/128 |
| 4,660,927 | 4/1987 | Kondow et al. | 385/141 |
| 4,756,599 | 7/1988 | Maeda et al. | 385/142 |
| 4,969,711 | 11/1990 | Rogler et al. | 385/141 |
| 5,000,541 | 3/1991 | DiMarcello et al. | 385/128 |
| 5,136,679 | 8/1992 | Broer et al. | 385/145 X |
| 5,146,531 | 9/1992 | Shustack | 385/128 |
| 5,146,535 | 9/1992 | Anzai et al. | 385/143 |
| 5,148,511 | 9/1992 | Sava et al. | 385/145 |
| 5,155,796 | 10/1992 | Oonishi et al. | 385/143 |

FOREIGN PATENT DOCUMENTS

| 0250996A3 | 1/1988 | European Pat. Off. | 385/145 X |
|---|---|---|---|
| 0375178A3 | 6/1990 | European Pat. Off. | 385/145 X |
| 0424063A2 | 4/1991 | European Pat. Off. | 385/145 X |
| 48-2566 | 1/1973 | Japan | 385/145 X |
| 51-52849 | 5/1976 | Japan | 385/145 X |
| 1558672 | 1/1980 | United Kingdom | 385/145 X |

Primary Examiner—Brian Healy
Attorney, Agent, or Firm—Finnegan, Henderson, Farabow, Garrett & Dunner

[57] ABSTRACT

A method and apparatus for producing a polymer-clad silica (PCS) optical fiber comprising a core of a transparent inorganic glass and a cladding of a transparent organic polymer characterized in that the amount of volatile components in its cladding is not more than 1 wt %, which method and apparatus comprise forming the core fiber, forming the cladding around the core fiber, and treating the cladding with a far infrared heater.

8 Claims, 1 Drawing Sheet

PLASTIC-CLAD SILICA (PCS) FIBERS AND METHODS AND APPARATUSES FOR PRODUCING THE SAME

This application is a continuation of application Ser. No. 07/905,196, filed Jun. 26, 1992, which is a continuation of application Ser. No. 07/798,335, filed Nov. 26, 1991, both now abandoned.

BACKGROUND OF THE INVENTION

1. Field of the Invention

This invention relates to a plastic-clad silica optical fiber, and a method for producing the same. More particularly, this invention relates to an optical fiber having a core-clad structure wherein the core material is transparent inorganic glass and the clad material is a transparent organic polymer, and to a method and apparatus for producing the same.

2. Description of the Related Art

Optical fibers having a core-clad structure and consisting of a pure silica or glass core and a plastic cladding (hereinafter referred to as PCS fibers) have been known, and they have hitherto been used in various fields, such as in the field of light communication over short distances of not more than 5 km, as light guides, as optical fibers to transmit images or energy, by making use of large apertures, large numerical apertures and low transmission loss properties.

Clad materials for PCS fibers should have 1) a low refractive index, 2) high transparency and 3) good adherence to a core material. Examples of those clad materials include heat-curable or light-curable silicone resins and fluorine-containing resins. However, it is difficult to find a crosslinking clad material which satisfies all three of the above requirements. A clad material having enough heat resistance and satisfying all three requirements has never been developed.

PCS fibers having a clad material of a tetrafluoroethylene-hexafluoropropylene copolymer or tetrafluoroethylene-vinylidene fluoride copolymer have been reported (Japanese Patent Kokoku Publication No. Sho. 48-25665 and Japanese Patent Kokai Publication No. Sho. 51-52849), but these clad materials often become opaque because of their crystalline nature, and thus the transmission loss of PCS fibers using these clad materials often becomes great.

Regarding the methods for coating a silica core with a clad material, methods such as 1) applying a liquid clad material onto an inorganic core, and then crosslinking the liquid clad material; 2) melt-covering a core with a clad polymer; 3) applying a solution of a clad polymer and a solvent onto a core fiber and evaporating the solvent, are generally employed.

However, a PCS fiber which is produced by one of the above methods has its physical properties changed over time, and this change over time becomes a serious problem for a PCS fiber that must have a light transmission loss of not more than 10 dB/km.

SUMMARY OF THE INVENTION

Accordingly, an object of the present invention is to provide a PCS fiber which is very reliable and which does not exhibit during use any decrease in its physical properties over time, and a method and apparatus for producing the same.

To achieve this object, and other objects that will be apparent from the following description, the inventors of the present invention made extensive studies to avoid the PCS fiber's decrease in the physical properties over time. We have found that if by an appropriate method the amount of volatile components, such as residual monomers or residual solvents, in the cladding is decreased below a certain level, the PCS fiber does not exhibit a decrease in its physical properties over time. If the clad layer of a PCS fiber contains volatile components, such as residual monomers or residual solvents, of more than 1 wt %, the volatile components evaporate in a high temperature environment. Consequently, the uniformity of the clad material is lost, and the mechanical strength of the PCS fiber decreases. In addition, the quality of the interface between the clad layer and the core fiber is damaged, and the transmission loss is increased. The inventors of the present invention have found that if the amount of the volatile components in the clad layer of the PCS fiber is made to be not more than 1 wt %, the physical properties of the PCS fiber are not so seriously damaged under normal conditions of use.

The above objects of the present invention can be attained by a PCS fiber comprising the core material of a transparent inorganic glass and the clad material of a transparent organic polymer, which PCS fiber is characterized in that the amount of the volatile components in the clad is not more than 1 wt %; by a method for producing it comprising first forming the clad layer by conically coating the core fiber with the clad material, and thereafter decreasing the amount of the volatile components in the clad layer to not more than 1 wt % by treating with a far infrared rays heater; and by an apparatus for producing the PCS fiber of the present invention.

DESCRIPTION OF THE PREFERRED EMBODIMENTS

Figure 1:
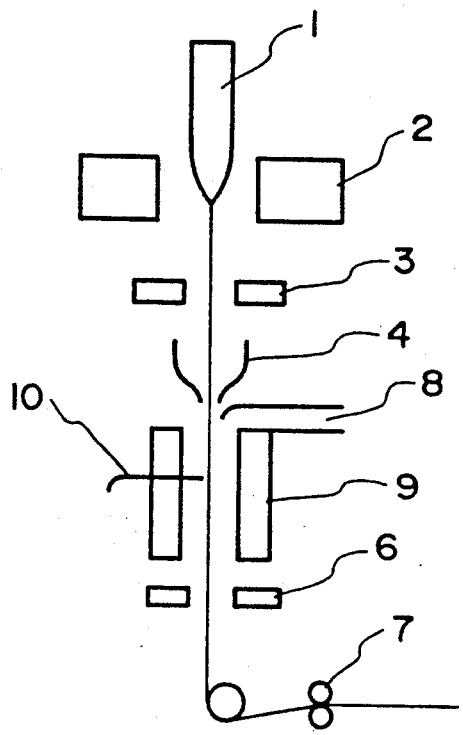
FIG. 1 is a drawing showing one example of the construction of an apparatus for producing the PCS fiber of the present invention.

As a method for forming the clad layer on the core fiber in the PCS fiber of the present invention. There is a method of conically coating a precursor of heat-curable or light-curable resin onto the core fiber and thereafter crosslinking the precursor by heat or light, or there is a method of conically coating a solution of a clad polymer onto the core fiber and thereafter evaporating the solvent in the solution by heating.

As methods for decreasing the amount of the volatile components to a low level, a method of increasing the heat or light energy for crosslinking the heat-curable or light-curable resins, that of extending the cure time, or that of increasing the amount of a polymerization initiator have hitherto been used. However, the inventors have found that with each of these methods it is vertually impossible to decrease the amount of the volatile components to a level of not more than 1 wt %. A hot-air drying method, which is used to heat the coated solution of a clad material and a solvent on the core fiber, takes too much time to decrease the amount of the volatile components to a low level, and thus the thermal decomposition and discoloration of the clad material, which are fatal to an optical fiber, are observed. It is believed by the inventors that the amount of the volatile components in clad layers of conventional PCS fibers is more than 1 wt %, since the volatile components in the clad layers will not volatilize under normal storage conditions because of their relatively high boiling points.

The inventors of the present invention made extensive studies to find good methods to decrease the amount of the volatile components in the clad layer to a level of not more than 1 wt %, and have found that the heat treatment of the clad layer with a far infrared heater can solve all problems mentioned above.

The far infrared rays used in the present invention are those rays having a wave length in the range of from 5 to 1,000 μm. Since the hot-air drying method increases the temperature of an object by external heating or by heat transfer from the surface, a thin film is formed on the surface of the clad layer, and the film formed prevents the evaporation of the volatile components from the clad layer. However, if the far infrared heater is used, the molecular vibrations of the clad polymer caused by the energy absorption from the heater heats the clad layer from its inside within a short period, and thus the heater can efficiently and easily decrease the amount of the volatile components to a level of not more than 1 wt %.

The amounts of the volatile components in the clad layer were determined by extracting the volatile components in amounts of 100 mg from the clad layer with an appropriate solvent and measuring the extracted material with a gas chromatograph.

Examples of the core material used in the present invention include silica, a multi-component glass, and a fluoride glass.

Examples of the clad materials used in the present invention include fluoroacrylate or fluoromethacrylate polymers, such as a homopolymer or copolymer of trifluoroethyl (meth)acrylate, pentafluoropropyl (meth)acrylate, hexafluoroisopropyl (meth)acrylate, and perfluorooctyl meth)acrylate, and a copolymer of any of these (meth)acrylates and any other copolymerizable monomers, cross-linked α-fluoroacrylate polymers obtained by crosslinking polymerization of fluoro(meth)acrylates and a crosslinking agent having not less than two polymerizable double bonds, a homopolymer or copolymer containing the polymerization units represented by the general formula (I), (II), or (III), and a copolymer of these polymerization units and other copolymerizable monomer units.

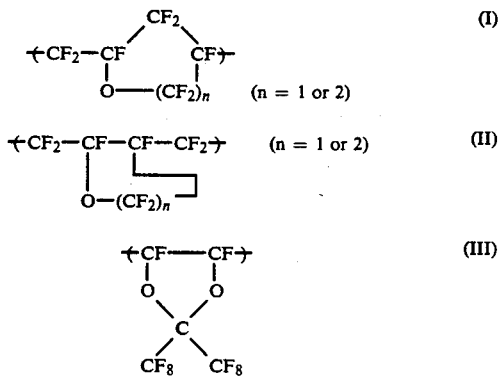

The PCS fiber of the present invention may further comprise not less than one protective layer around the outer surface of the clad layer, and the protective layer may take any appropriate structure.

The PCS fiber of the present invention and the method for producing the same will be described below in more detail with reference to the following examples.

Figure 2:
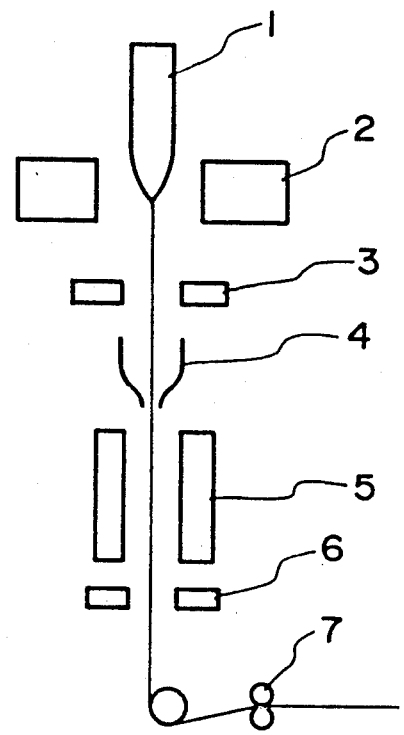
FIGS. 2 and 3 are drawings showing examples of the construction of conventional apparatuses.
Figure 3:
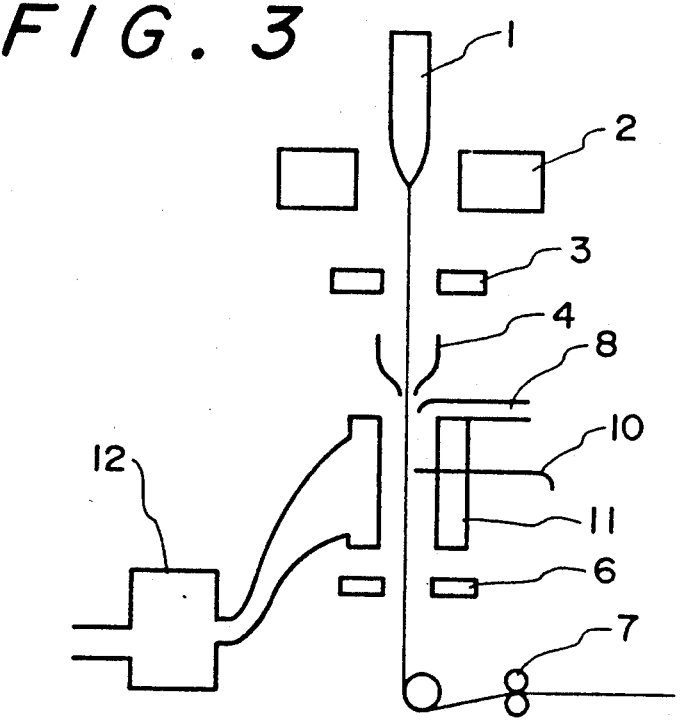

The apparatus for producing the PCS fiber of the present invention is shown in FIG. 1, FIGS. 2 and 3 show conventional apparatuses for producing PCS optical fiber. Of these figures, reference numeral 1 designates a glass preform, 2 a glass melting furnace, 3 a core-size measure, 4 a pot for coating a clad material, 5 a UV radiation furnace, 6 an apparatus for measuring the size of PCS fiber, 7 nip rollers, 8 an exhaust duct, 9 a far infrared heater, 10 a thermocouple for measuring the internal temperature of the furnace, 11 a hot-air dryer, and 12 a hot-air generator.

FIG. 1 shows one example of the apparatus of the present invention. This apparatus is suitable for drying the solution of the clad polymer and a solvent. It is apparent that the apparatuses of FIGS. 2 and 3 can be easily converted into the apparatus of the present invention by incorporating a far infrared heater after UV radiation furnace 5 in FIG. 2, or after the hot-air oven in FIG. 3.

EXAMPLE 1

A clad material precursor consisting of the following blend was prepared:

| | |
|---|---|
| 2,2,3,3,3-pentafluoropropyl acrylate (5FA) | 40 wt % |
| 1H,1H,2H,2H-perfluorodecyl acrylate (17FA) | 40 wt % |
| trimethylol propane triacrylate (TMPTA) | 15 wt % |
| benzyldimethylketal | 5 wt % |

A silica preform having an outer diameter of 30 mmφ was melted at 2,120° C., pulled at a speed of 50 m/min, and a core fiber having an outer diameter of 200 μm and having a refractive index of 1.46 was formed. Thereafter, the above clad material precursor was applied through a clad material coating dice onto the core fiber to form a clad layer, and UV rays were irradiated for 0.5 second while the fiber was passed through a UV radiation furnace having a power of 120 W/cm. Thereafter the fiber was passed through a far infrared heater maintained at 200° C., and a PCS fiber having an outer diameter of 230 μm resulted. The refractive index of the clad layer thus-prepared was 1.385. The glass transition temperature (Tg) of the clad material of the thus-obtained PCS fiber was 128° C., and the amount of the residual monomers measured by gas chromatography was 0.6 wt %. The transmission loss of this PCS fiber was 4 dB/km. The change of the transmission loss time was measured by subjecting the PCS fiber to an elevated temperature for 2,000 hours. The test results are shown in Table 1.

COMPARATIVE EXAMPLE 1

A PCS fiber was obtained by the same method as that used in EXAMPLE 1, except that a blend indicated in Table 1 was used as the clad material precursor and that no treatment with the far infrared heater was used. The refractive index of the clad layer was 1.388.

The amount of the residual monomers in the clad layer of the PCS fiber thus obtained was 1.5 wt %, and the transmission loss was 4 dB/km. The resulting change in the transmission loss over time is also shown in Table 1.

EXAMPLE 2

The apparatus as shown in FIG. 1 was used in this Example. A clad polymer was obtained by adding 0.8 wt % of n-butyl mercaptan and 0.2 wt % of azobis-(isobutyronitrile)(AIBN) to a blend of 39 wt % of α-fluoro 2,2,3,3,3 hexafluoropropyl acrylate (α-F5FA) and 60 wt % of α-fluorohexafluoroisopropyl acrylate (α-F6FA), conducting a bulk polymerization for 5 hours at 70° C., and by conducting deaeration in a vacuum at 180° C. The thus-prepared clad polymer had a refractive index of 1.364 and a Tg of 102° C. This clad polymer was dissolved in acetone, and a 20 wt % solution of the clad polymer was prepared.

A silica preform having an outer diameter of 30 mmφ was melted at 2,120° C., pulled at a speed of 30 m/min, and a core fiber having an outer diameter of 200 μm was formed. Thereafter, the above clad solution was applied through a clad material coating dice onto the core fiber to form a clad layer, and the clad layer was dried by passing the fiber through a far infrared heater having a heater temperature of 270° C. and an atmospheric temperature of 200° C. for 5 seconds. A PCS fiber having an outer diameter of 230 μm was obtained.

The residual acetone in the clad layer of the PCS fiber obtained was 0.4 wt % as measured by gas chromatography. The transmission loss was 6 dB/km.

COMPARATIVE EXAMPLE 2

The apparatus shown in FIG. 2 was used in this Example.

The same solution used in EXAMPLE 2 was applied onto a core fiber obtained by pulling the preform at a speed of 5 m/min. The clad layer on the core fiber was dried by passing it through the hot-air oven (atmospheric temperature 200° C.) while blowing the hot-air, from a hot-air generator having a heater temperature of 270° C., vertically to the passing direction of the fiber, at a speed of 5 m/sec for 60 seconds, onto the surface of the fiber.

The amount of the residual acetone in the clad layer of the PCS fiber obtained was 5.7 wt %, and the transmission loss was 7 dB/km. The physical properties of the PCS fiber obtained are shown in Table 1.

EXAMPLE 3

The apparatus shown in FIG. 1 was used in this Example.

A copolymer (Refractive index 1.308; Tg 170° C.) consisting of 70 mole % of perfluoro-2,2-dimethyl-1,3-dioxole (PDD) and 30 mole % of tetrafluoroethylene (TFE) was dissolved in perfluoro(2-butyltetrahydrofuran) to prepare a 20 wt % solution of the clad polymer.

A silica preform having an outer diameter of 30 mmφ was melted at 2,120° C., pulled at a speed of 30 m/min, and a core fiber having an outer diameter of 200 μm was formed. Thereafter, the above solution was applied through a clad material coating dice onto the core fiber to form a clad layer, and the clad layer was dried by passing the fiber through a far infrared heater having a heater temperature of 270° C. for 5 seconds, and a PCS fiber having an outer diameter of 230 μm was obtained. The amount of the residual solvent in the clad layer of the PCS fiber was 0.3 wt % as measured by gas chromatography, and the transmission loss of the PCS fiber was 5 dB/km. The physical properties are shown in Table 1.

COMPARATIVE EXAMPLE 3

The apparatus shown in FIG. 3 was used in this Example.

The same solution used in EXAMPLE 3 was applied onto a core fiber obtained by pulling the preform at a speed of 5 m/min. The clad layer on the core fiber was dried by passing it through the hot-air oven while blowing the hot-air from a hot-air generator having a heater temperature of 270° C., vertically to the passing direction of the fiber, at a speed of 5 m/sec for 60 seconds, onto the surface of the fiber.

The amount of the residual solvent in the clad layer of the PCS fiber obtained was 12.3 wt % as measured by gas chromatography, and the transmission loss was 7 dB/km.

The change of the transmission loss over time in an elevated temperature is shown in Table 1.

TABLE 1

| | Core Material | Clad Material | | Clad Drying Method | Amount of the Residual Monomers or Solvents in the cladding (wt %) | Transmission Loss of the PCS fiber (dB/km) | PCS Heat Resistance Test | |
|---|---|---|---|---|---|---|---|---|
| | | | | | | | Conditions | Transmission Loss (dB/km) |
| Ex. 1 | silica | 5FA<br>17FA<br>TMPTA<br>benzyldimethylketal | 40 wt %<br>40 wt %<br>15 wt %<br>5 wt % | UV Curing and Far infrared Heater | 0.6 | 4 | 120° C.<br>2000 HR | 6 |
| Com. Ex. 1 | silica | 5FA<br>17FA<br>TMPTA<br>benzyldimethylketal | 40 wt %<br>40 wt %<br>19 wt %<br>1 wt % | UV Curing | 1.5 | 4 | 120° C.<br>2000 HR | 14 |
| Ex. 2 | silica | a-F5FA<br>a-F6FA<br>n-butyl mercaptane<br>AIBN | 39 wt %<br>60 wt %<br>0.8 wt %<br>0.2 wt % | Far Infrared Heater | 0.4 | 6 | 100° C.<br>2000 HR | 6 |
| Com. Ex. 2 | silica | a-F5FA<br>a-F6FA<br>n-butyl mercaptane<br>AIBN | 39 wt %<br>60 wt %<br>0.8 wt %<br>0.2 wt % | Hot-air Oven | 5.7 | 7 | 100° C.<br>2000 HR | 26 |
| Ex. 3 | silica | PDD<br>TFE | 60 mole %<br>40 mole % | Far infrared Heater | 0.3 | 5 | 150° C.<br>2000 Hr | 5 |
| Com. Ex. 3 | silica | PDD<br>TFE | 60 mole %<br>40 mole % | Hot-air Oven | 12.3 | 7 | 150° C.<br>2000 HR | >100 |

What is claimed is:

1. An optical fiber, having a core-clad structure, comprising a core of a transparent inorganic glass and a cladding of a transparent organic polymer, which optical fiber is characterized in that the amount of volatile components in the cladding is not more than 1 wt %.

2. An optical fiber, having a core-clad structure, comprising a core of a transparent inorganic glass and a cladding of a transparent organic polymer, which optical fiber is characterized in that the amount of volatile components in the cladding is decreased to a level of not more than 1 wt % by heating with a far infrared heater.

3. The optical fiber of claim 1 or 2, wherein the cladding is comprised of a polymer containing at least one monomer unit selected from the monomer units represented by the general formulas (I), (II) and (III).

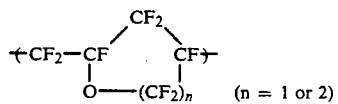
(n = 1 or 2) (I)

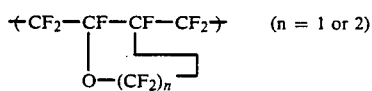
(n = 1 or 2) (II)

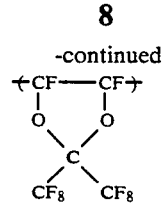
(III)

4. The optical fiber of claim 1 or 2, wherein the optical fiber further comprises not less than one protective layer on the cladding.

5. A method for producing an optical fiber comprising:
a) forming a core fiber from a transparent inorganic glass; and
b) forming a cladding of a transparent organic polymer, having a refractive index less than that of the core fiber, on the core fiber; and
c) evaporating the volatile components in the cladding with a far infrared heater to a level of not more than 1 wt %.

6. The method for producing of claim 5, wherein the cladding is formed by conically applying a transparent heat-curable or light-curable resin on the core fiber, and by crosslinking the resin.

7. The method for producing of claim 5, wherein the cladding is formed by conically applying a solution of a transparent organic polymer, having a refractive index less than that of the core fiber, on the core fiber.

8. An apparatus for producing an optical fiber comprising a preform melting furnace, a diameter measuring device for measuring the diameter of the core fiber, a clad material coating pot, a far infrared heater, a measuring device for measuring the diameter of the optical fiber, and nip rollers.

* * * * *